United States Patent [19]
Bailey

[11] Patent Number: 6,047,414
[45] Date of Patent: Apr. 11, 2000

[54] COMBINATION PACKABLE TOILET AND STOOL

[76] Inventor: Gerald A. Bailey, 3208 S. 97th, Fort Smith, Ark. 72903

[21] Appl. No.: 09/238,650

[22] Filed: Jan. 26, 1999

[51] Int. Cl.[7] .................................................. A47K 11/06
[52] U.S. Cl. ................................................................ 4/484
[58] Field of Search ............................. 4/460, 476, 483, 4/484

[56] References Cited

U.S. PATENT DOCUMENTS

| | | | |
|---|---|---|---|
| 1,026,413 | 5/1912 | Sullivan | 4/460 |
| 2,849,726 | 9/1958 | Vay | 4/476 |
| 3,600,719 | 8/1971 | Karr | 4/484 X |
| 4,403,729 | 9/1983 | Wytko | 229/149 |
| 5,187,819 | 2/1993 | Grimes | 4/484 X |
| 5,682,623 | 11/1997 | Fenoglio | 4/484 X |

*Primary Examiner*—Charles E. Phillips
*Attorney, Agent, or Firm*—Head, Johnson & Kachigian

[57] ABSTRACT

The present invention provides a combined toilet and stool that may be deployed as a toilet or a stool. The invention includes an interlockable structure of die-cut paperboard. The unitary structure includes a series of abutting sections that may be arranged to form four walls that define an internal bowl. The walls and bowl are covered by an upper section formed from additional abutting sections. The abutting wall sections include interlockable interior and exterior front panels, a rear panel and two angled side panels. The multiple component upper section includes an interlockable interior seat panel, an exterior seat panel and a selectively displaceable covering seat panel. The interior seat panel abuts the top of the rear panel. The exterior seat panel abuts the top of the exterior front panel. The covering seat panel abuts a side of the exterior seat panel. Appropriate perforations are defined between adjacent panels to enable the abutting panels to be appropriately folded for both storage and assembly. Perforations also bisect each side panel along its longitudinal axis to enable the sides to angle inwardly to form two spaced apart internal pillars beneath the seat panels. Two spaced apart holes and corresponding locking tabs in the front exterior panel and front interior panel respectively permit the interlocking of these two panels. The invention may be stored in a compacted configuration in conventional shrink wrap packaging. The folded configuration may be bound with a cord. During deployment, the folded configuration is expanded in an accordian-like fashion and the support members are interlocked. The support members include the interior and exterior front panels and the interior seat panel. When used as a toilet, the internal bowl can employ a receptacle to receive wastes or deposit wastes directly on the surface beneath. Appropriate paper for sanitary purposes may be included also.

3 Claims, 4 Drawing Sheets

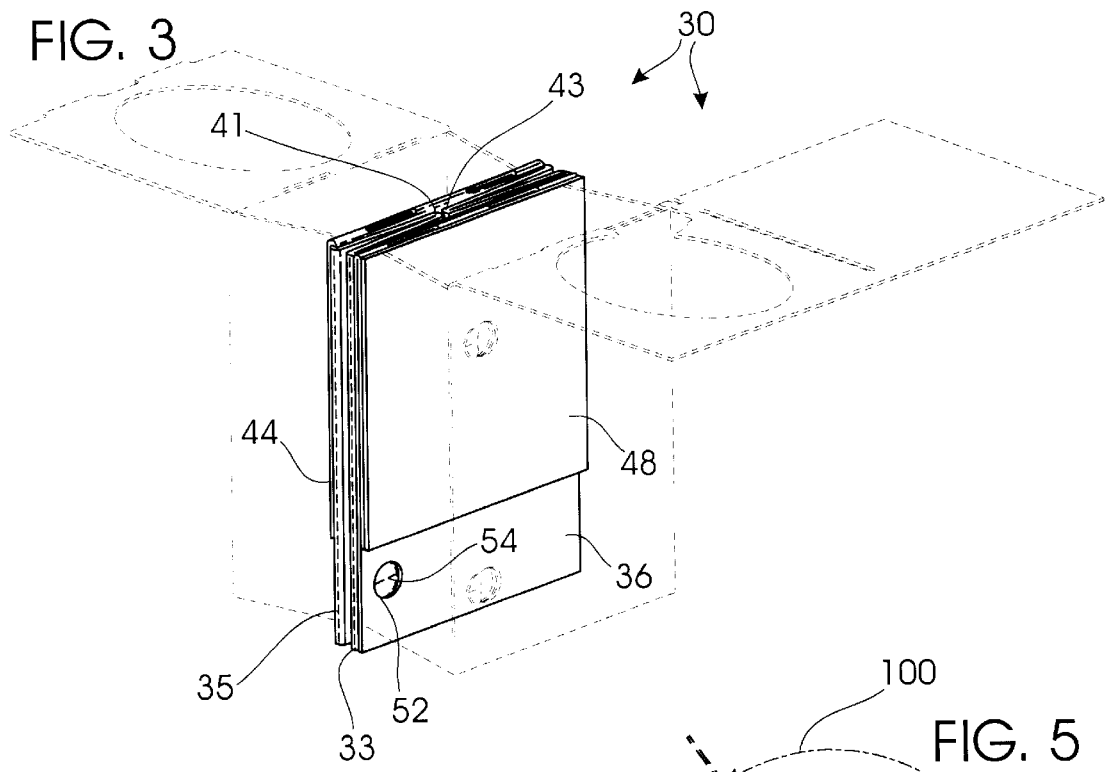
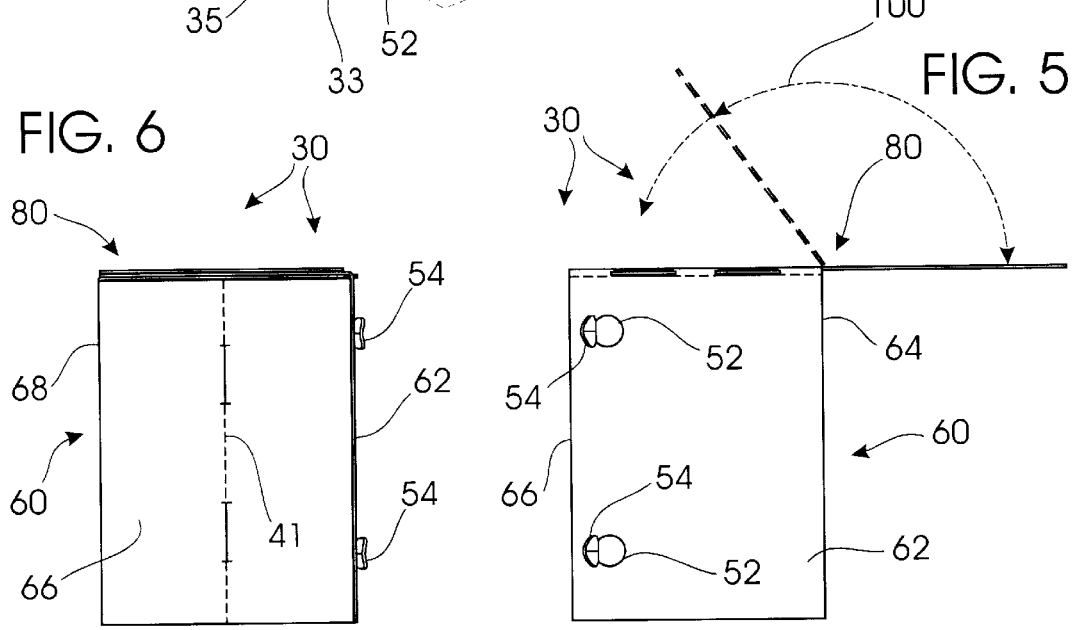
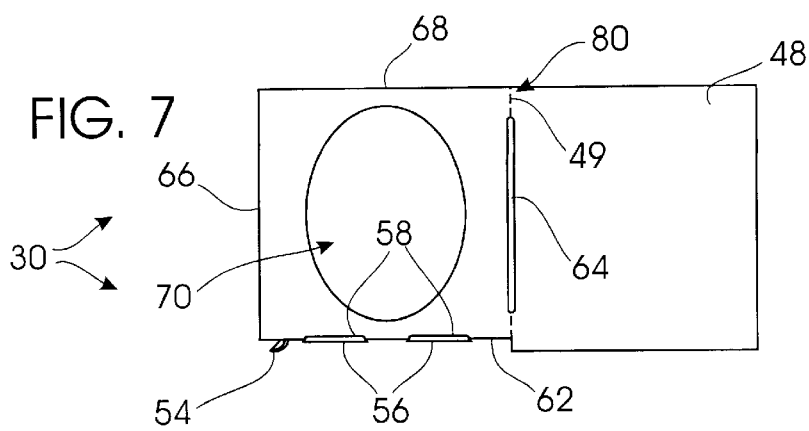

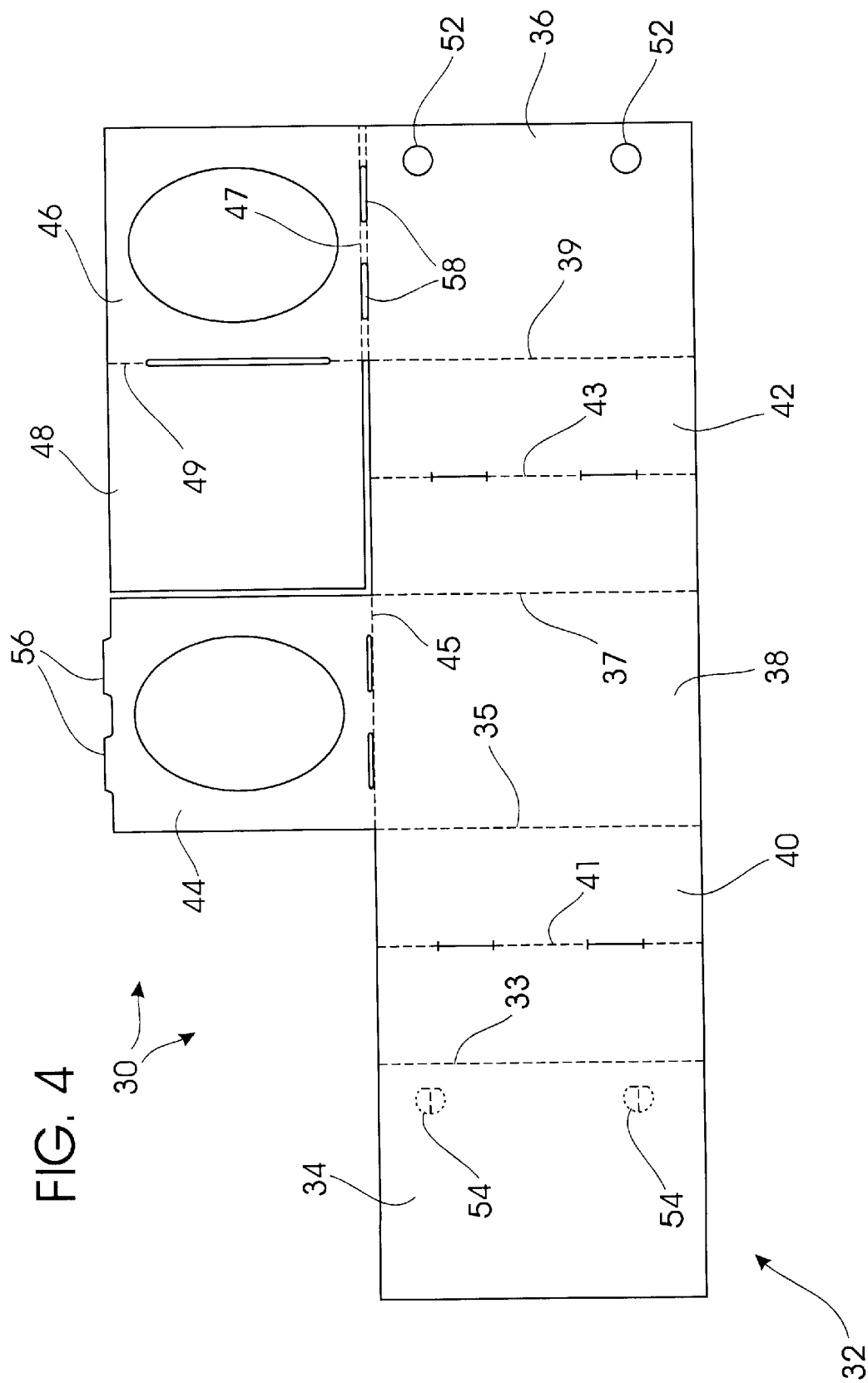

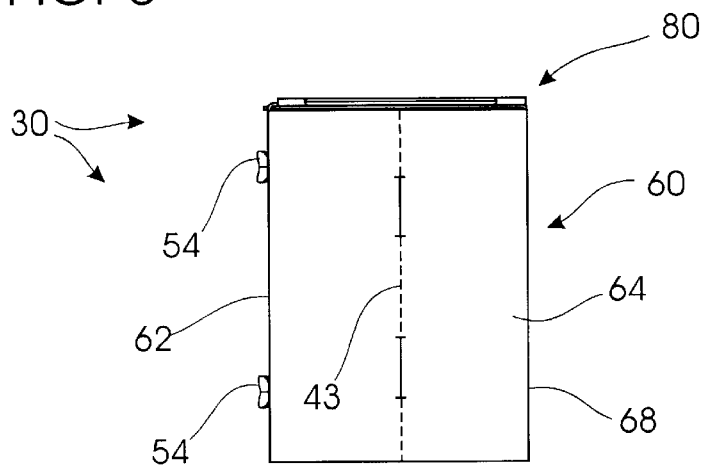
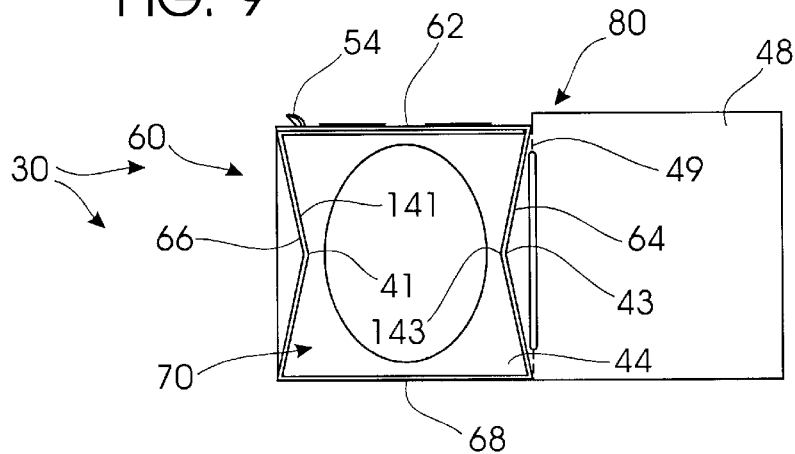
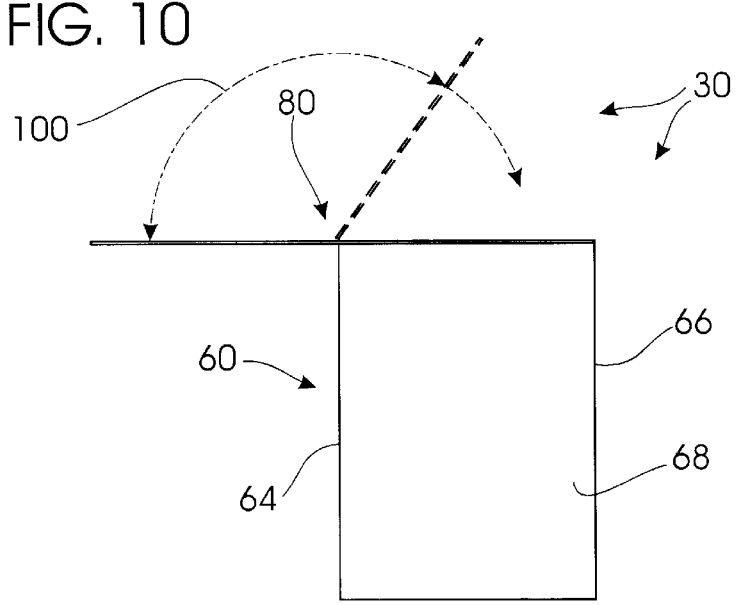

COMBINATION PACKABLE TOILET AND STOOL

BACKGROUND OF THE INVENTION

1. Field of the Invention

The present invention generally relates to a lightweight folding stool with an integral toilet. More particularly, the present invention includes a compact, packable, combined toilet and stool for outdoor use. The present invention may be disposed of after an initial use or used repetitively as desirable. Ideally, the invention is biodegradable by incineration or burial.

2. Known Art

As will be appreciated by those skilled in the art, toilets have evolved considerably since their introduction. Although various different designs are currently being used, most toilets share several features and functions. For example, conventional toilets generally include a permanently mounted bowl that is filled with water. The bowl is supported by a frame with a seat and an integral reservoir. The reservoir contains the necessary amount of water to "flush" the toilet after use. The frame is generally positioned over a drain through which the flushed wastewater with entrained contents are conducted. The drain connects to an appropriate sewer connection to channel the wastewater away from the structure and to an appropriate receptacle. Further, most toilets are typically housed in an enclosure to give the user privacy.

One of the problems associated with permanent structures that house conventional toilets is that they are not readily portable. Another problem associated with conventional toilets is that their large size and weight make them difficult to transport easily. Another problem with convention al toilets is that their plumbing and associated fixtures are not readily mobile. As a result, most toilets are not portable.

However, there exists a need for portable toilets for use while camping, hiking, hunting or participating in other activities where conventional toilets are not readily accessible. At most remote locations, such as many campsites, recreational parks, fields, woods, hiking trails, state parks, wildlife preserves and sanctuaries, wilderness retreats, national forests and the like, toilets are generally not widely available and/or accessible. While many persons enjoy the solitude these remote locations afford, they often forgo these locations because of the attendant lack of sanitary toilets. These persons deserve the convenience and comfort of a sanitary toilet at these locales.

Furthermore, toilets are often not readily available when traveling. In such instances, the traveler may find themselves in a deserted region or area with no conventional toilet facilities available. Such travelers also deserve the comfort and sanitation of a toilet.

Moreover, it is desirable to provide a personal device that may be deployed by a user relatively quickly. In this manner, their primary activity does not become the necessity of assembling a toilet. This also enables the user to return to their former activity more quickly while also maintaining sanitary conditions.

Many of the toilets on the market today are large permanent structures, such as the previously described conventional toilets. These type of structures are not suited for outdoor use because of the weight of the structures and their bulky nature. For example, conventional toilets often weigh in excess of ten pounds and contain at least two gallons of water weighing an additional eighteen pounds. Thus, a conventional toilet can easily exceed twenty-eight pounds in weight. These structures are also not suited for transportation to remote locations for the same reasons.

Other types of portable toilets have previously been proposed to address these concerns. For example, U.S. Pat. No. 4,199,826, shows a portable toilet combination. This device shows a structure shaped like a suitcase. The device has various compartments for storing accessories and a central compartment for waste reception. While the device may be portable in some fashion, it appears to be relatively large and bulky. Consequently, it would be difficult to transport easily, especially for backpackers and the like. Also, it appears as if the device would require an inordinately large amount of storage space when not in use. Thus, it would adversely affect the storage space otherwise available to a traveller in a vehicle.

Another portable toilet example is shown in U.S. Pat. No. 5,524,301. This device shows two separate components that may be folded to decrease the overall bulk of the device. However, the device does not appear to provide a suitable seating structure when not in use as a toilet. Also, the device is not a unitary structure and the disparate top could be easily lost or misplaced, causing the device to malfunction.

U.S. Pat. No. 3,801,991 shows a portable self-contained toilet that is reasonably sized compared to conventional toilets but still entirely too bulky. This device also uses fluids to flush its bowl. As a consequence, the device would be weighty as well. The device also fails to provide a comfortable seating structure when not in use as a toilet. U.S. Pat. No. Des. 358,459, U.S. Pat. Nos. 5,526,537 and 5,586,344 show various portable toilet structures. However, none of these devices appear to be compact. They also fail to provide a comfortable seating structure when not in use as a toilet.

Thus, there exists a need in the art for an improved packable combined stool and toilet with a unitary structure that is compact and light-weight. An improved device would function as a stool or toilet as necessary. An ideal device could be easily assembled from a compacted storage configuration very quickly.

SUMMARY OF THE INVENTION

The present invention addresses the above-referenced needs in the art. The present invention provides a combined toilet and stool that may be deployed as a toilet or a stool. The present invention is lightweight and capable of being carried by a backpacker during transportation to campsites or other remote locales. Ideally, the toilet is comprised of an environmentally safe, biodegradable, corrugated paperboard and glue that permit the entire device to be incinerated or buried if desirable.

In an exemplary embodiment, the invention is formed from corrugated paperboard to be compact and light-weight. The resulting unitary structure may be easily and quickly assembled, resulting in an assembled structure that is strong and rigid but lightweight. The invention may then be easily deposited in an appropriate waste receptacle and/or incinerated in a campfire and/or buried beneath the surface for disposal after use.

In particular, the invention includes an interlockable structure of die-cut paperboard. The unitary structure includes a series of abutting sections that may be arranged to form four walls that define an internal bowl. The walls and bowl are covered by an upper section formed from additional abutting sections.

The abutting wall sections include interlockable interior and exterior front panels, a rear panel and two angled side panels. The panels are aligned in abutting configuration in the following order: interior front panel, first side panel, rear panel, second side panel and exterior front panel.

The multiple component upper section includes an interlockable interior seat panel, an exterior seat panel and a selectively displaceable covering seat panel. The interior seat panel abuts the top of the rear panel. The exterior seat panel abuts the top of the exterior front panel. The covering seat panel abuts a side of the exterior seat panel.

Appropriate perforations are defined between adjacent panels to enable the abutting panels to be appropriately folded for both storage and assembly. Perforations also bisect each side panel along its longitudinal axis to enable the sides to angle inwardly to form two spaced apart internal pillars beneath the seat panels. Two spaced apart holes and corresponding locking tabs in the front exterior panel and front interior panel respectively permit the interlocking of these two panels.

In one exemplary embodiment, the invention may be easily and compactly folded for storage. In particular, the invention may be conveniently stored in this compacted configuration in conventional shrink wrap packaging. The folded configuration may also be further bound with an encircling cord or rope or the like to retain this shape.

During deployment, the structure is removed from the packaging and the retaining cord is removed, permitting the folded configuration to expand in an accordian-like fashion into a preliminary operative configuration. The user may quickly finalize assemble of the operative configuration for the structure by interlocking the support members. In an exemplary embodiment, the support members include the interior and exterior front panels and the interior seat panel. Ideally, the assembled structure will support at least two hundred and seventy-five pounds of weight.

When assembled, the structure that may be conveniently deployed as a stool in a conventional manner or advantageously used as a toilet. When used as a toilet, the internal bowl can employ a receptacle to receive wastes. After use, the user may simply remove the receptacle and dispose of it appropriately. Another receptacle can then be inserted into the bowl to use the toilet again. The receptacle can be formed from plastic or another leakproof material. In another exemplary embodiment, the toilet may be used without an internal receptacle.

Since the bottom of the structure's internal bowl is open, waste can be directly deposited on the ground or into an open pit beneath the structure. When used as an open pit toilet, the user preferably excavates a hole beneath the toilet for the retention of waste. After use, the toilet can be alternatively moved to a nearby location for continued use with the filled hole covered or the structure may be disposed in the pit or otherwise disposed of as well (i.e., incinerated or the like).

In another exemplary embodiment, appropriate paper for sanitary purposes is included inside the shrink-wrap packaging for the invention. In yet another exemplary embodiment, the shrink-wrap packaging may also be used as a receptacle for waste. In this manner, the user wastes no material when using the invention.

Thus, a principal object of the present invention is to provide a lightweight, packable combined toilet and stool that is compact and easily transportable.

Another object of the present invention is to provide a disposable toilet made of sturdy corrugated paperboard to support the weight of various users.

Another object of the present invention is to provide a biodegradable, easily transportable toilet and stool.

Another object of the present invention is to provide a toilet that permits collection of waste excretions and subsequent disposal.

Another object of the present invention is to provide a portable toilet and stool structure that may be easily incinerated.

Another object of the present invention is to provide a portable structure that may be used as a toilet or stool as desirable.

Another object of the present invention is to provide a emergency toilet that may be easily assembled quickly.

Another object of the present invention is to provide a emergency toilet that may be easily assembled with minimal instruction and tools.

Another object of the present invention is to provide a combined toilet and stool that uses a disposable receptacle to retain wastes in order to permit the continued sanitary use of the stool and toilet.

Another object of the present invention is to minimize the number of accessories necessary for travellers, hikers, campers, hunters and the like to transport while maximizing sanitary conditions for these individuals.

BRIEF DESCRIPTION OF THE DRAWINGS

FIG. 3 is a front perspective view of the present invention in a storage configuration before conversion into an operative configuration;

FIG. 4 is a front elevational view of the exemplary embodiment in accordance with the present invention in an initial configuration before folding into the storage configuration;

FIG. 5 is a front elevational view thereof;

FIG. 6 is a side elevational view taken generally from the left of FIG. 1;

FIG. 7 is a top plan view thereof;

FIG. 8 is a side elevational view taken generally from the right of FIG. 1;

FIG. 9 is a bottom plan view thereof; and,

FIG. 10 is a rear elevational view thereof.

DETAILED DESCRIPTION OF THE PREFERRED EMBODIMENTS

Figure 1:
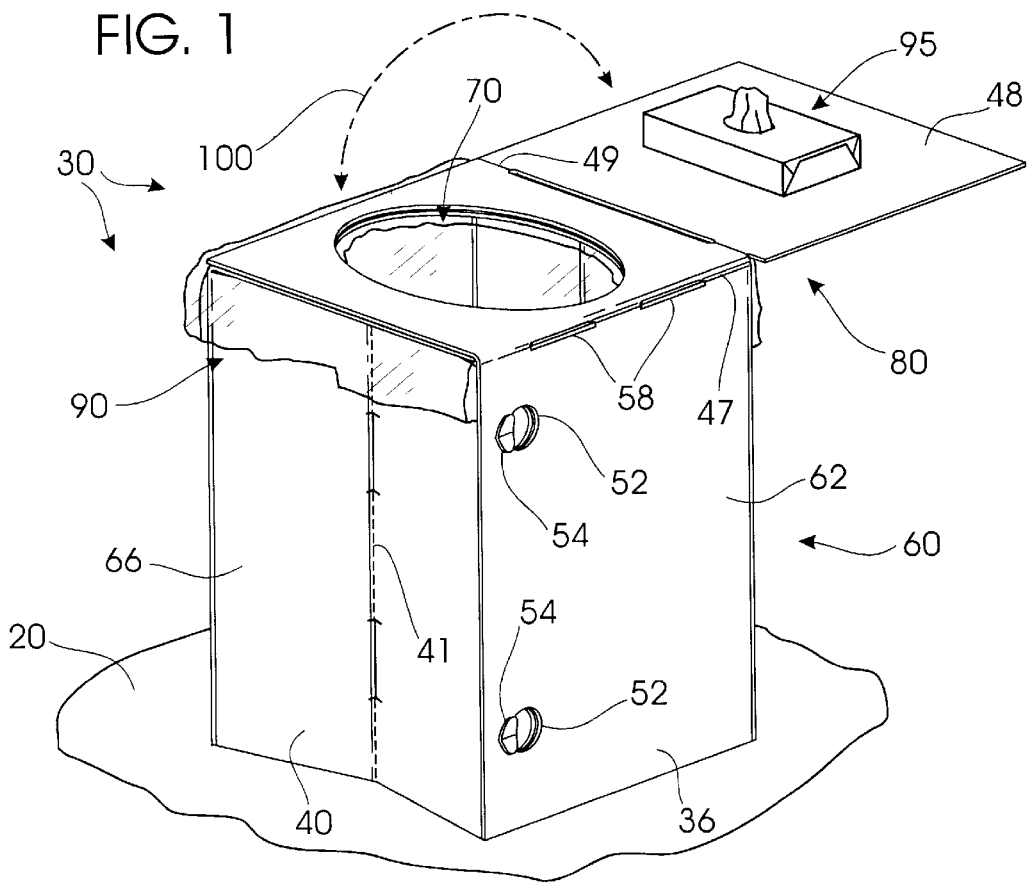
FIG. 1 is a front perspective view of an exemplary embodiment in accordance with the present invention.

The improved packable combined toilet and stool is generally indicated by reference numeral 30 in FIGS. 1–10. The invention 30 provides a combined toilet and stool that may be deployed as either a toilet or a stool as desirable. The present invention is lightweight and capable of being carried by a backpacker during transportation to campsites or other remote locales. Ideally, the combination 30 is comprised of an environmentally safe, biodegradable, corrugated paperboard and glue that permit the entire device to be incinerated or buried if desirable.

In an exemplary embodiment, the combination 30 is formed from corrugated paperboard to be compact and light-weight (FIG. 4 ). The resulting unitary cut-out 32 may be easily and quickly folded an unitary structure 60 (FIGS. 1–3, and 5–10). The resulting structure 60 is strong and rigid while remaining lightweight. After use, device 60 may be easily deposited in an appropriate waste receptacle and/or incinerated in a campfire and/or buried beneath the surface for disposal.

The cut-out 32 includes a series of abutting sections 34, 36, 38, 40, 42, 44, 46 and 48 (FIG. 4). The interlockable interior and exterior front panels 34, 36, a rear panel 38 and two angled side panels 40, 42 are preferably abutting linearly. Thus, the interior front panel 34 is against the first side panel 40 and the side panel 40 is against the rear panel 38 and the rear panel 38 is against the second side panel 42 and the side panel 42 is against the exterior front panel 36. The interlockable interior seat panel 44, an exterior seat panel 46 and a selectively displaceable covering seat panel 48 are also preferably aligned linearly, although not abutting. The interior seat panel 44 abuts the top of the rear panel 38. The exterior seat panel 46 abuts the top of the exterior front panel 36. The covering seat panel 48 abuts a side of the exterior seat panel 46.

Appropriate perforations 33, 35, 37, 39, 45, 47 and 49 are defined between adjacent panels 34, 36, 38, 44, 46 and 48 to enable the abutting panels to be appropriately folded for both storage and assembly. Perforation 33 is defined between the front panel 34 and the side panel 40. Perforation 35 is defined between the side panel 40 and the rear panel 38. Perforation 37 is defined between the rear panel 38 and the side panel 42. Perforation 39 is defined between the front panel 36 and the side panel 42. Perforation 45 is defined between the rear panel 38 and the interior seat panel 44. Perforation 47 is defined between the front panel 36 and the exterior seat panel 46. Perforation 49 is defined between the exterior seat panel 46 and the covering seat panel 48.

Two more perforations 41 and 43 also bisect each side panel 40 and 42 along its longitudinal axis. The perforations 41, 43 to enable the sides 40, 42 to angle inwardly to form two spaced apart internal pillars beneath the seat panels 44, 46 and 48.

During the assembly of structure 60, several sections (the interlockable interior and exterior front panels 34, 36, a rear panel 38 and two angled side panels 40, 42) are arranged to form four walls 62, 64, 66 and 68 (i.e., front, two sides and a rear) that define an internal bowl 70. The walls 62, 64, 66, 68 and bowl 70 are covered by an seat section 80 formed from the other sections 44, 46, 48.

The front panels 34 and 36 are interlocked after the walls have been aligned to maintain the assembled structure 60. The exterior front panel 36 defines two spaced apart holes 52 while the interior front panel 34 defines corresponding locking tabs 54. The tabs 54 a realigned and inserted through holes 52 to couple the front panels 34, 36. The interior seat panel 44 is also interlocked with the interior front panel 34 to secure the seat 80 to the wall section. Protruding tabs 56 are inserted into appropriate slots 58 on the interior front panel 34 to couple the seat thereto.

In one exemplary embodiment, the invention may be easily and compactly folded for storage (as seen best in FIG. 3). In particular, the invention may be conveniently stored in this compacted configuration in conventional shrink wrap packaging. The folded configuration may also be further bound with an encircling cord or rope or the like to retain this shape.

During deployment, the folded cut-out 32 (i.e., structure 60), is removed from the packaging and the retaining cord is removed, permitting the folded configuration to expand in an accordian-like fashion (as indicated by arrow 105 in FIG. 2) into a preliminary operative configuration (as shown by the phantom lines in FIG. 3). As can best be seen by referring to FIGS. 2 and 3, the user may quickly transform the invention 30 from its compact, stored configuration as shown in FIG. 3 into the operative configurations shown in FIGS. 1 and 2.

Figure 2:
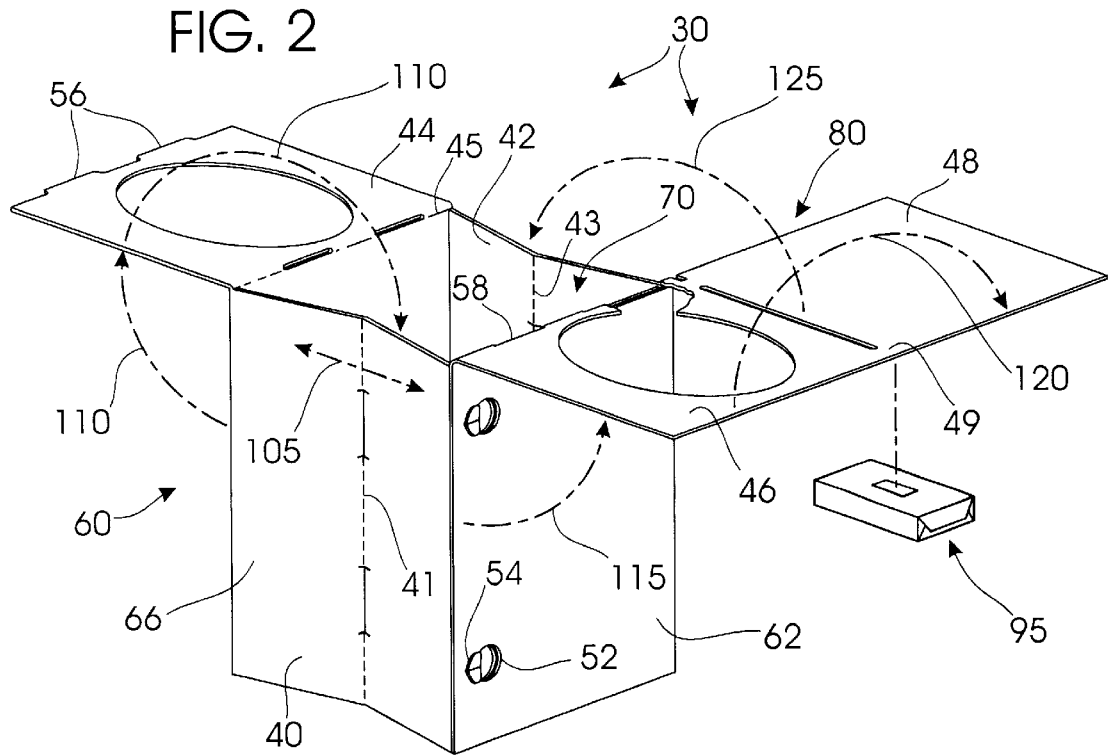
FIG. 2 is a front perspective view of the present invention during conversion into an operative configuration with the top panels open and without a disposable receptacle in the internal bowl.

The user may then finish the conversion from the initial deployment shown in FIG. 2 to the final configuration shown in FIG. 1 by quickly folding the top 80 into place. The user first moves panel 44 as indicated by arrow 110 into a position on top of side panels 40 and 42 so that tabs 56 can be inserted into holes 58. Next, the user moves panel 46 upward as indicated by arrow 115 so that lid 48 can be opened as indicated by arrow 120. The exterior seat panel 46 is then folded on top of panel 44 as indicated by arrow 125. The tabs 54 and 56 are inserted through holes 52 and 58 respectively In particular, the side panels 40 and 42 form supporting pillars 141 and 143 along perforation lines 41 and 43 respectively beneath top 80.

The user may quickly finalize assemble of the operative configuration for the structure 60 by interlocking the support members. In an exemplary embodiment, the support members include the interior and exterior front panels, side panels and the seat panels. Ideally, the assembled structure 60 will support at least two hundred and seventy-five pounds of weight.

When assembled, the structure 60 may be conveniently deployed as a stool in a conventional manner or advantageously used as a toilet (FIGS. 1 and 5–10) by opening or closing lid 48 as indicated by arrow 100. When used as a toilet, the internal bowl 70 can employ a receptacle 90 to receive wastes. After use, the user may simply remove the receptacle 90 and dispose of it appropriately. Another receptacle can then be inserted into the bowl 70 to use the structure 60 as a toilet again. The receptacle 90 can be formed from plastic or another leakproof material.

The structure 60 may be used as a toilet (as shown in FIGS. 2, 6 and 8) alternately without the internal receptacle 90. Since the bottom of the structure's internal bowl 70 is open, waste can be directly deposited on the ground 20 or into an open pit beneath the structure (not shown). When used in this fashion, the user preferably excavates a hole beneath the toilet for the retention of waste. After use, the toilet can be alternatively moved to a nearby location for continued use with the filled hole covered or the structure may be disposed in the pit or otherwise disposed of as well (i.e., incinerated or the like).

An appropriate paper dispenser 95 for may also be included with the invent ion. In a not her exemplary embodiment, the shrink-wrap packaging itself can also be used as a receptacle for waste. In this manner, the user wastes no material when using the invention.

Whereas, the present invention has been described in relation to the drawings attached hereto, it should be understood that other and further modifications, apart from those shown or suggested herein, may be made within the spirit and scope of this invention.

What is claimed is:

1. A combined toilet and stool that may be transformed between a storage configuration and an operative configuration by expanding in an accordion-like fashion when deployed by a user, said combined toilet and stool comprising:

a folding structure including a front wall and a spaced apart, parallel rear wall, said front and rear walls connected by spaced apart, side walls to define an interior bowl with an open bottom and top and wherein each of said sides comprising means to enable said sides to angle inwardly near their middle to form two spaced apart integral internal support pillars and wherein said front wall includes an interior panel and an exterior panel and wherein said interior panel comprises at least one tab and said exterior panel comprises at least one hole adapted to receive said tab during the said transformation; and, an interlockable interior seat panel and exterior seat panel providing openings aligned to function as a toilet seat and an integral cover for said seat panels.

2. The combined toilet and stool as recited in claim 1 further including a disposable receptacle adapted to be disposed in said bowl to receive waste deposited therein when said combined toilet and stool is used as a toilet.

3. The combined toilet and stool as recited in claim 2 further including a paper dispenser affixed to said cover.

* * * * *